Oct. 17, 1961  J. J. DUFFY  3,004,390
FAST ACTING SERVO MECHANISM
Original Filed Jan. 31, 1957  3 Sheets-Sheet 1

INVENTOR.
James J. Duffy
BY
ATTORNEYS

Oct. 17, 1961  J. J. DUFFY  3,004,390
FAST ACTING SERVO MECHANISM
Original Filed Jan. 31, 1957  3 Sheets-Sheet 3

INVENTOR.
James J. Duffy
BY
ATTORNEYS

United States Patent Office 3,004,390
Patented Oct. 17, 1961

3,004,390
FAST ACTING SERVO MECHANISM
James J. Duffy, Detroit, Mich., assignor to Ford Motor Company, Dearborn, Mich., a corporation of Delaware
Continuation of abandoned application Ser. No. 637,436, Jan. 31, 1957. This application Aug. 11, 1959, Ser. No. 833,108
6 Claims. (Cl. 60—97)

My invention relates generally to fluid pressure operated mechanism and more particularly to a servo cylinder and piston arrangement capable of actuating a work performing member.

My invention is particularly adapted to be used for energizing friction brake bands or clutches and it is capable of providing an initial, fast acting clutch or brake engaging motion for taking up the free play in the clutch or brake operating linkage. This initial motion is followed by a brake energizing force which increases in successive stages thereby effecting a cushioned braking operation. The improved servo structure of my invention finds particular utility in automatic transmission mechanisms for motor vehicles wherein one or more brakes or clutches are employed for regulating the relative motion of the transmission gear elements, a movable transmission clutch or brake actuating member being mechanically connected to a fluid pressure operated portion of the servo structure.

This application forms a continuation of my pending application Serial No. 637,436, filed January 31, 1957, now abandoned.

I am aware of other types of servo mechanisms of known construction for use with friction brakes or the like which are capable of the above-mentioned fast acting, slack take-up feature. However, the brake actuating force applied by the servo mechanism increases very slowly in magnitude during a time interval following initial brake engagement and this is followed by a rather abrupt transition to a final brake energizing force of increased magnitude. If a brake or clutch mechanism employs such a conventional servo mechanism and it is used to change the angular velocity of a rotating component of an automatic transmission mechanism, the rate of acceleration or deceleration of that component will be non-uniform and the shifting sequence from one gear ratio to another may be lacking in smoothness.

One conventional transmission servo of this type is formed with bleed orifices in the relatively movable portions thereof for providing a controlled communication between the fluid working chamber and the sump region of the transmission controls, the orifices providing a somewhat cushioned application of an associated brake member. However, these orifices bleed oil during the initial stages of operation of the servo as well as during the final cushioning stage and the total time interval required to energize this servo is accordingly increased to a value exceeding the corresponding time interval of a servo of the same capacity embodying my invention. Also, the amount of oil required to operate the servo exceeds the actual fluid capacity of the servo working chamber and, if the system employs a fluid pump as a pressure source, this necessitates an increase in the pumping requirements of the pump. Since transmission pumps are usually designed to meet minimum requirements, the use of a servo mechanism having such a conventional fast acting feature would cause a considerable delay in the shift time interval. Also, the pressure buildup in the working chamber of such a servo is substantially less than the pressure build-up which occurs in my improved servo mechanism during the corresponding time interval although the latter is considerably shorter in the case of my improved construction.

According to a principal feature of my invention I have provided an improved servo mechanism of the type above described wherein the operating time interval is characterized by multiple stages, a first operating stage providing a fast acting, initial movement of the actuating member for eliminating the free play in the operating linkage and wherein the actuating force thereafter increases in subsequent stages until a maximum value is reached.

It is a further object of my invention to provide a servo mechanism of the type above set forth which is simple in construction, and which includes a compound piston structure having relatively movable portions defining a first working chamber of minimum fluid capacity to effect an initial take-up motion of the actuated member and a relatively large working chamber to provide a greater working area and to produce a maximum actuating force.

It is a further object of my invention to provide a servo mechanism as set forth above in the preceding objects wherein the transition from one stage to another is characterized by a maximum degree of smoothness.

It is another object of my invention to provide a servo mechanism wherein the time interval required to energize the same is substantially shorter than the corresponding time interval for conventional servo mechanisms of comparable fluid capacity.

For the purpose of particularly describing a preferred embodiment of my invention, reference will be made to the accompanying drawings wherein.

Although I have illustrated the improved servo of my instant invention with a friction brake band of the type employed in automatic transmission of conventional construction, I contemplate that it may also be applied with success in other installations.

Figure 1:
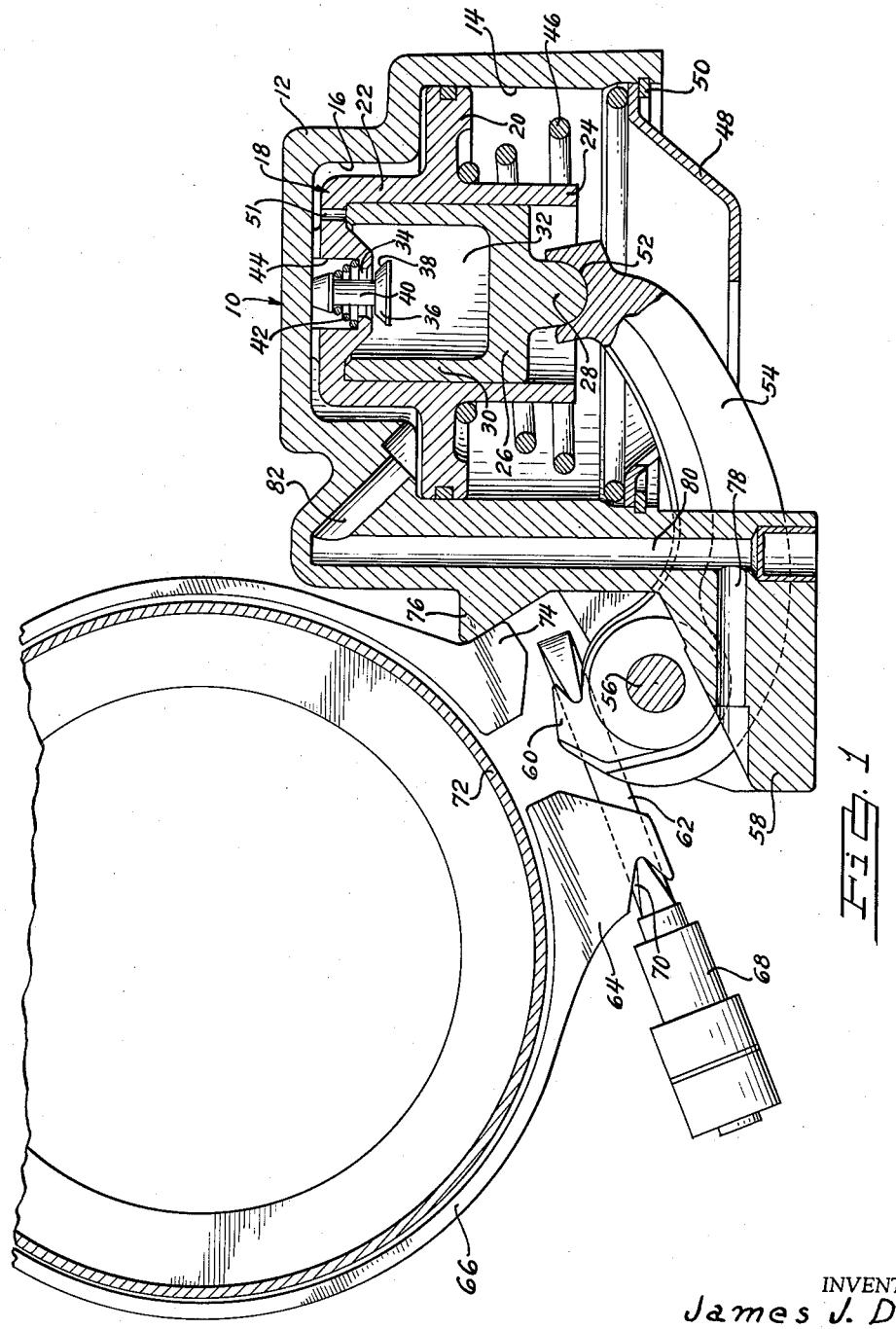
FIGURE 1 shows a cross sectional assembly view of the improved servo mechanism of my invention acting in cooperation with a friction band brake of the type used in automatic transmissions. The servo piston as shown in FIGURE 1 is shown in the de-energized position.

Referring first to FIGURE 1, numeral 10 is used to generally designate the improved servo construction of my instant invention and it comprises a main casing 12 which defines a working cylinder including a large diameter portion 14 and a relatively reduced diameter portion 16. A piston assembly 18 is disposed within the casing 12 and it includes a large diameter portion 20 acting in cooperation with the cylinder portion 14. The cylinder portion 20 is formed with a centrally situated upper extension 22 and a lower skirt 24 which define a pilot cylinder for slidably receiving a pilot piston 26. The piston 26 includes a head 28 and a skirt 30 and it cooperates with its associated cylinder to define a working chamber 32 of reduced volume. The head of the piston portion 22 is formed with a central aperture 34 within which is positioned a movable valve element 36, the latter comprising a head forming a tapered valve seat 38 and a stem 40 which extends through the opening 34. The stem 40 is formed with an annular shoulder which serves as a seat for a conical spring 42, the other end of spring 42 seating on the base of a relatively large diameter extension 44 of the opening 34.

As illustrated in FIGURE 1, the stem 40 of the valve 36 contacts the upper end wall of the cylinder portion 16 and compresses the spring 42 to lift the valve seat 38 away from the opening 34 to provide communication between the working fluid chamber 32 and the working chamber defined by the outer working cylinder portions 14 and 16 above the piston 20. The piston 20 is urged in an upward direction, as viewed in FIGURE 1, by conical compression spring 46 which is seated on a closure plate 48 located in the lower end of the cylinder portion 14. The closure plate 48 is maintained in place by a conventional snap ring 50. A precalibrated orifice 51 is formed in the upper end of the piston extension 22 to provide a controlled degree of communication between the fluid pressure chamber 32 and the working chamber on the upper side of piston 20. The function of orifice 51 will subsequently be described in the statement of the operation of the invention.

The base 28 of pilot piston 26 is rounded to provide a convex bearing surface 52 which is adapted to engage a mating concave surface formed on the end of a rocker arm 54, the latter extending through an aperture located in the closure plate 48. The end of the rocker arm 54 is rotatably journaled on a pin 56 which in turn is supported by a boss 58 which, by preference, is formed integrally with the casing 12 of the servo structure. The boss 58 is bipartite in form and it defines a space situated between two walls within which the end of the rocker arm 54 extends, the pin 56 bridging the space. The proximate end of the rocker arm 54 may be connected to an extension 60 of an end section 64 of a friction brake band indicated at 66. The effective length of the link 62 may be varied by means of a suitable threaded adjustment 68. The band end section 64 is formed with a notch 70 which cooperates with the link 62 as indicated.

The band 66 encircles a brake drum 72 which may form a portion of a gear arrangement of a multiple speed transmission or the like. The other end of the brake band 66 is formed with a shoulder portion 74 which is adapted to be anchored by a contacting portion 76 of the cylinder casing 12, the casing 12 thereby being effective to absorb the brake reaction torque. The casing 12 may be permanently anchored to the transmission housing to maintain the same in a relatively stationary position.

Fluid pressure may be admitted to the working chamber on the upper side of the piston 20 through passages 78, 80 and 82. These passages may form a portion of a complete transmission control circuit which is not illustrated.

Figure 2:
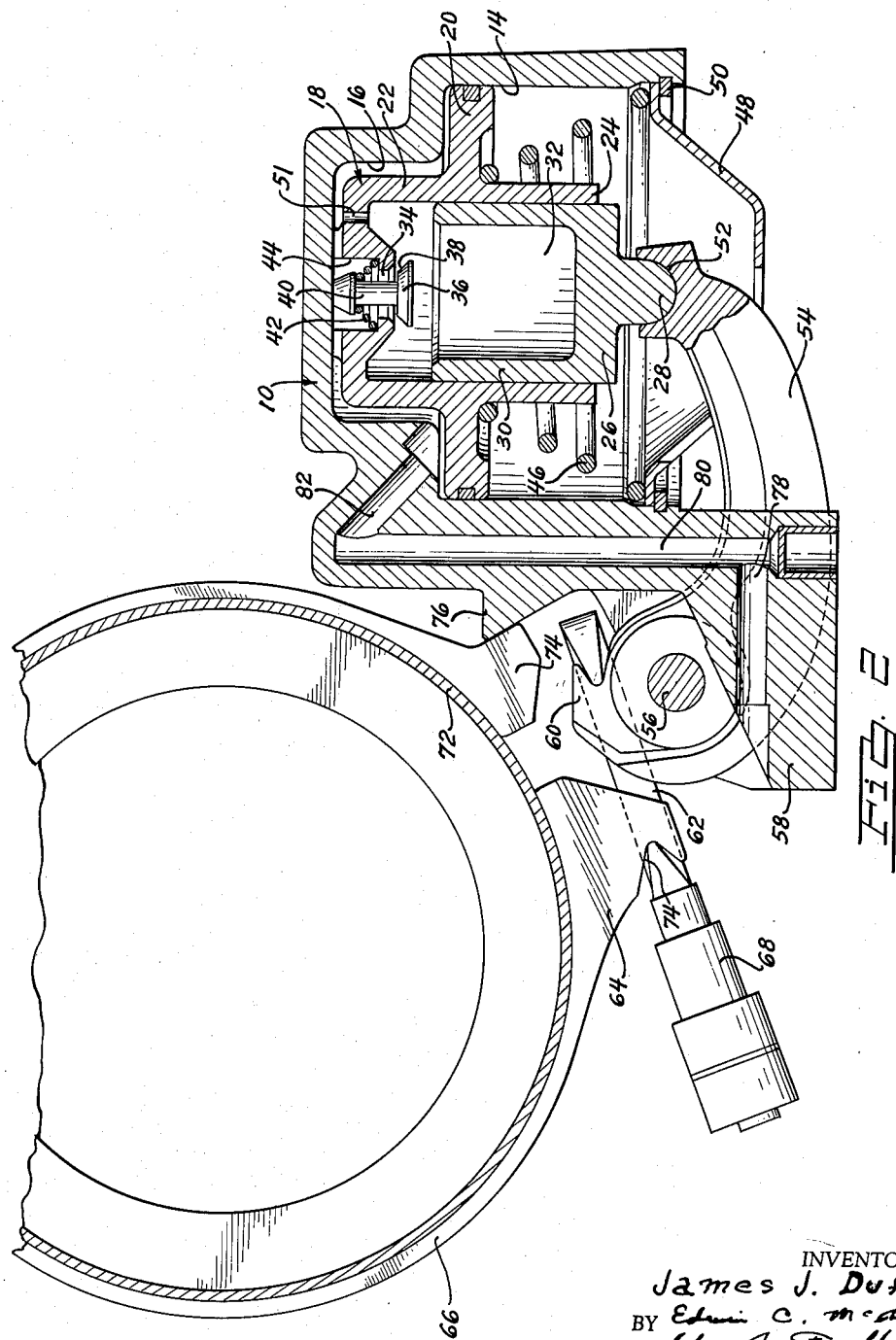
FIGURE 2 is a view similar to that of FIGURE 1 wherein the servo piston has assumed an extended position following the first operating stage during which the free play in the brake linkage is taken up.

During operation, the servo structure of my invention assumes the condition shown in FIGURE 1 when the brake drum 72 rotates freely about its axis. When braking of the drum 72 becomes necessary during a shift sequence, fluid pressure is introduced into the working cylinder 12 above the piston 20 through the passages 78, 80 and 82. Since the valve 36 assumes a fully opened position as indicated in FIGURE 1, fluid pressure will immediately be admitted to the working chamber 32 defined by the pilot piston 26. Since the fluid capacity of the working chamber 32 is relatively small, the pilot piston 26 will move quickly to an extended position as indicated in FIGURE 2 thereby taking up the free play in the brake actuating linkage to cause the brake band 66 to come in contact with the drum 72. This action takes place rapidly by reason of the fact that only a relatively small volume of oil must be introduced into the compound piston structure to effect the required take-up motion. Following this initial movement of the pilot piston, the fluid pressure in the chamber above the piston 20 will begin to increase and the piston 20 will begin to move in a downward direction as viewed in FIGURES 1 through 3. After a slight initial movement of the main piston 20, the valve 36 assumes a closed position under the influence of the spring 42 thereby trapping the fluid in the working chamber 32. The pressure force of the fluid above the main piston 20 will be transmitted to the rocker arm 54 through the medium of the fluid in the chamber 32 and the spring 46 will begin to compress as the fluid pressure above the piston 20 continues to increase. The preload of the spring 46 is sufficient to maintain the piston 20 in a fully upward position until the pilot piston 28 has assumed its fully extended position.

Figure 3:
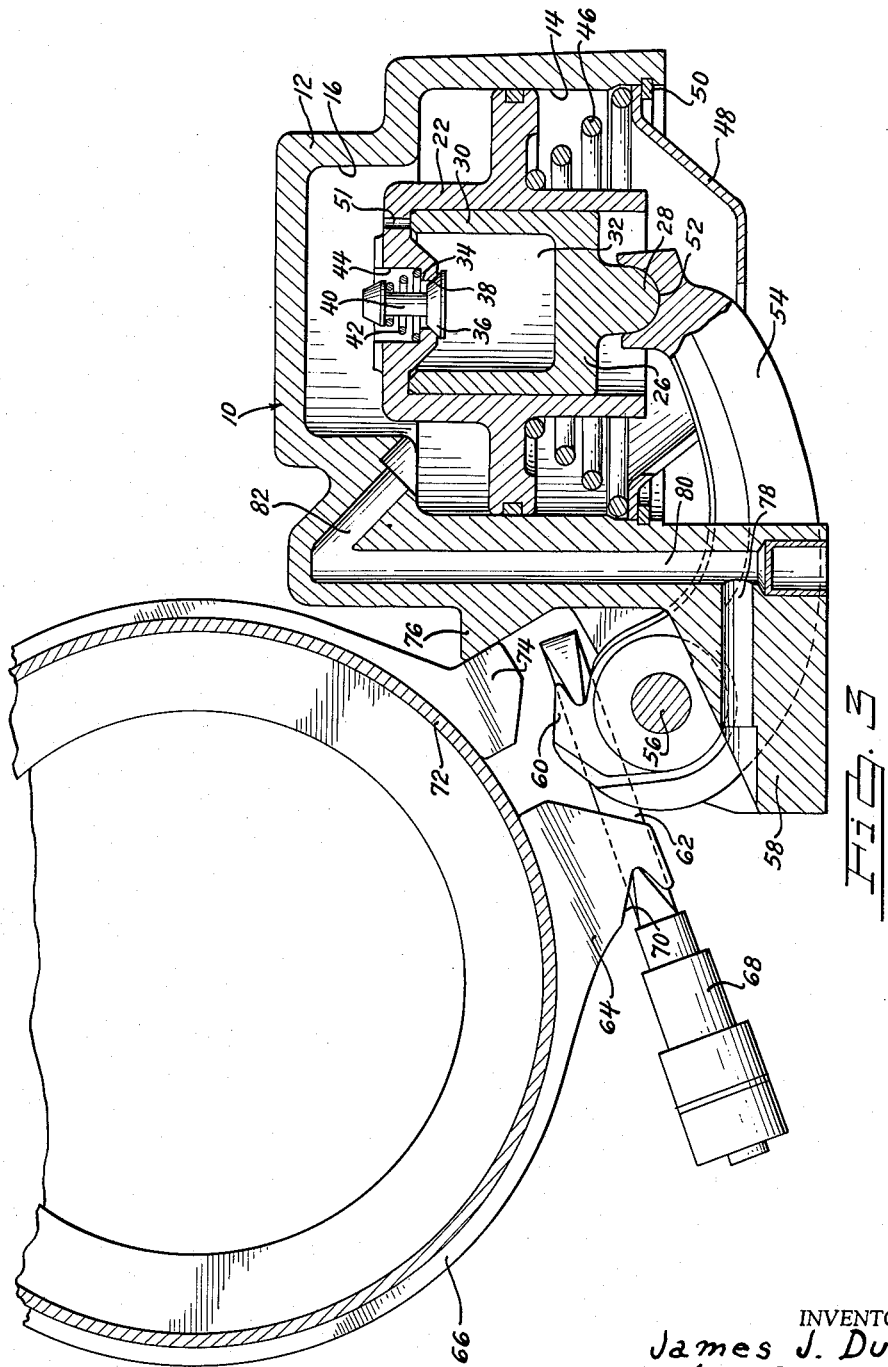
FIGURE 3 is a cross sectional view similar to FIGURE 1 wherein the servo piston has assumed a final energized position.

If the fluid pressure in the working chamber above the main piston 20 continues to increase, the piston 20 will continue to move until it assumes the position shown in FIGURE 3 at which time the pilot piston 26 bottoms against the piston extension 22. Since an increase in fluid pressure will no longer be associated with a change in the volume of the effective working chamber after the main piston 20 assumes the position shown in FIGURE 3, the fluid pressure will immediately increase to its maximum value as determined by a main pressure regulator valve located in the control circuit.

It is apparent from the inspection of FIGURES 2 and 3 that the capacity of the working chamber 32 decreases as the main piston 20 moves from the position shown in FIGURE 2 to that shown in FIGURE 3. The precalibrated orifice 51 is adapted to accommodate the transfer of fluid from the interior of the working chamber 32 to the main working chamber above the main piston 20 during the downward motion of the latter. This fluid metering action provides a cushioned brake energizing operation. It is emphasized that the amount of fluid which is necessary to completely energize the servo mechanism is equal in magnitude to the fluid capacity of the working chamber above the main piston 20 and, except for normal leakage, all of the fluid supplied to the servo mechanism is effectively utilized. Also, after the initial slack take-up motion of the pilot piston has been completed and after the valve 36 assumes a closed position, the pressure in the working chamber 32 increases to a valve exceeding the value of the pressure build-up in the chamber above the main piston 20. Since the fluid contained in the working chamber 32 is caused to bleed through the orifice 51 by reason of the pressure differential thereacross, this pressure build-up in the main working chamber will be accompanied by a corresponding pressure build-up in the working chamber 32 in order that the restricted fluid flow through the orifice 51 might be continued, but the actual static pressure in working chamber 32 will be greater than the corresponding static pressure in the main working chamber during this operating stage. Since the effective force on the end of the crank 54 is a direct function of the pressure existing in the working chamber 32 during the downward motion of the piston 20, the effective force transmitted to the brake band 66 will be correspondingly increased during relative telescopic movement of the pistons. Further, if an orifice between the working chamber 32 and the sump for the transmission controls would be substituted for the orifice 51 in the disclosed embodiment, compensation would be necessary for the fluid which would be exhausted therethrough. Since the time interval required to complete the operating sequence is dependent upon the total fluid necessary to operate the compound pistons, and since part of the fluid supplied to the pistons is thus lost, the total time interval would be proportionately increased.

After the pilot piston bottoms against the main piston 20, the total effective pressure in the working chamber 32 in applicant's structure will have reached a precalibrated limiting value which approaches the maximum line pressure made available by the pressure source. The pressure increase which takes place the instant the pilot piston bottoms against the main piston 20 may be readily predetermined for any given design.

It is thus apparent from the foregoing description that the servo structure of my instant invention is effective to substantially reduce the operating time while simultaneously providing for a pressure increase in successive stages during the shortened operating time interval. Both of these features are desirable in producing a smooth transmission shift sequence.

What I claim and desire to secure by United States Letters Patent is:

1. A fluid pressure operated servo mechanism for actuating a movable member comprising a cylinder, a compound piston movably disposed within said cylinder, said piston comprising a main piston portion defining in part a main fluid working chamber within said cylinder and a pilot piston portion slidably disposed within said main piston portion in telescopic relationship therewith, said pilot piston portion and said main piston portion defining another fluid working chamber of lesser volume than the main fluid working chamber, a check valve formed in said main piston portion providing a one-way transfer of fluid from said main working chamber to said other working chamber, said pilot piston portion being adapted to actuate said movable member, and a precalibrated orifice in said main piston portion positioned to provide continuous, restricted fluid flow between said working chambers during relative telescopic movement of said piston portions whereby a cushioned actuating force is applied to said movable member during an initial operatting interval and wherein an intermediate actuating force build-up occurs during a subsequent operating interval upon relative movement of said piston portions, said force build-up being followed by a final sustained operating force upon positive engagement of said piston portions.

2. A fluid pressure operated servo mechanism for actuating a movable, work performing member and comprising a cylinder, a compound piston including a main piston portion telescopically received within said cylinder and defining therewith a first working chamber, said compound piston further including a pilot piston portion movable relative to said main piston portion in telescopic relationship therewith, said piston portions defining a second working chamber having a lesser volume than the first working chamber, a check valve formed in said main piston portion providing one-way fluid communication between said working chambers, said check valve including a portion positioned to be engaged with a wall of said cylinder to open the same when said main piston portion assumes a deenergized, limiting position, and a flow restricting orifice in said main piston portion positioned to provide continuous, restricted fluid flow between said working chambers during relative telescopic movement of said pilot piston portion and said main piston portion, said pilot piston portion being adapted to actuate said movable, work performing member, the operation of said servo mechanism being characterized by multiple operating stages whereby an initial actuating force of reduced magnitude is produced by the fluid pressure in said second working chamber and whereby an intermediate pressure build-up subsequently occurs in said first working chamber upon movement of said main piston portion relative to said pilot piston portion, the fluid displaced from said second working chamber during relative movement of said piston portions being metered through said orifice directly into said first working chamber.

3. A fluid pressure operated servo mechanism for actuating a work performing member and comprising a casing, said casing defining a main fluid working cylinder, a compound piston disposed within said main cylinder, said compound piston including a main piston portion telescopically related with respect to said cylinder and defining a main fluid working chamber, a pilot cylinder formed in said compound piston in coaxial relationship with respect to said main cylinder, said compound piston further including a pilot piston portion movably situated in said pilot cylinder and defining therewith a secondary fluid working chamber, a one-way check valve formed in said main piston portion and adapted to accommodate the transfer of pressurized fluid from said main working chamber to said secondary working chamber, a flow restricting orifice located in said main piston portion and positioned to provide continuous, restricted fluid flow between said working chambers during relative telescopic movement of said main piston portions, and spring means for urging said main piston portion toward a de-energized, limiting position, said check valve being engageable with a relatively stationary part of said cylinder to cause the same to open when said main piston portion assumes said limiting position, said pilot piston portion being adapted to actuate said work performing member, the operation of said servo mechanism being characterized by multiple operating stages whereby an initial actuating force of reduced magnitude is produced by the fluid pressure in said secondary working chamber and whereby an intermediate pressure build-up subsequently occurs in said main working chamber upon movement of said main piston portion relative to said pilot piston portion, the fluid displaced from said working chamber during relative movement of said piston portions being metered through said orifice directly into said main working chamber.

4. The combination as set forth in claim 3 wherein said main piston portion is substantially T-shaped in cross section with respect to a plane containing the axis of said main cylinder, the radially inward parts of said main piston portion being elongated in the direction of the axis of said main cylinder to define said pilot cylinder.

5. The combination as set forth in claim 4 wherein one end of said main fluid working chamber is similar in shape to the cooperating parts of said main piston portion thereby defining a minimum working volume for a given working area.

6. In a multiple stage fluid pressure operated mechanism for actuating a movable member, a cylinder, a compound piston movably disposed within said cylinder, said compound piston comprising a main piston portion defining in part a main fluid working chamber within said cylinder and a pilot piston portion adapted for relative telescopic movement with respect to said main piston portion, said pilot piston portion and said main piston portion defining a secondary working chamber of lesser volume than said main fluid working chamber, a check valve means in said compound piston for providing a one-way transfer of fluid from said main working chamber to said secondary working chamber, and a precalibrated orifice formed in one of said piston portions adapted to provide restricted fluid flow between said working chambers during relative telescopic movement of said main piston portion and said pilot piston portion, said pilot piston portion being adapted to actuate said movable member, a first operating stage of said servo mechanism being characterized by an initial actuating force of reduced magnitude produced by the fluid pressure in said secondary working chamber and a subsequent operating stage of said servo mechanism being characterized by an intermediate pressure build-up in said main working chamber upon movement of said main piston portion relative to said pilot piston portion, the fluid displaced from said secondary working chamber during relative movement of said pilot piston portion with respect to said main piston portion being metered through said orifice directly into said main working chamber.

References Cited in the file of this patent

UNITED STATES PATENTS

| | | |
|---|---|---|
| 2,513,192 | McFarland | June 27, 1950 |
| 2,633,712 | Sheppard | Apr. 7, 1953 |
| 2,638,750 | Hettinger | May 19, 1953 |
| 2,790,515 | Hawley | Apr. 30, 1957 |